Patented Feb. 21, 1939

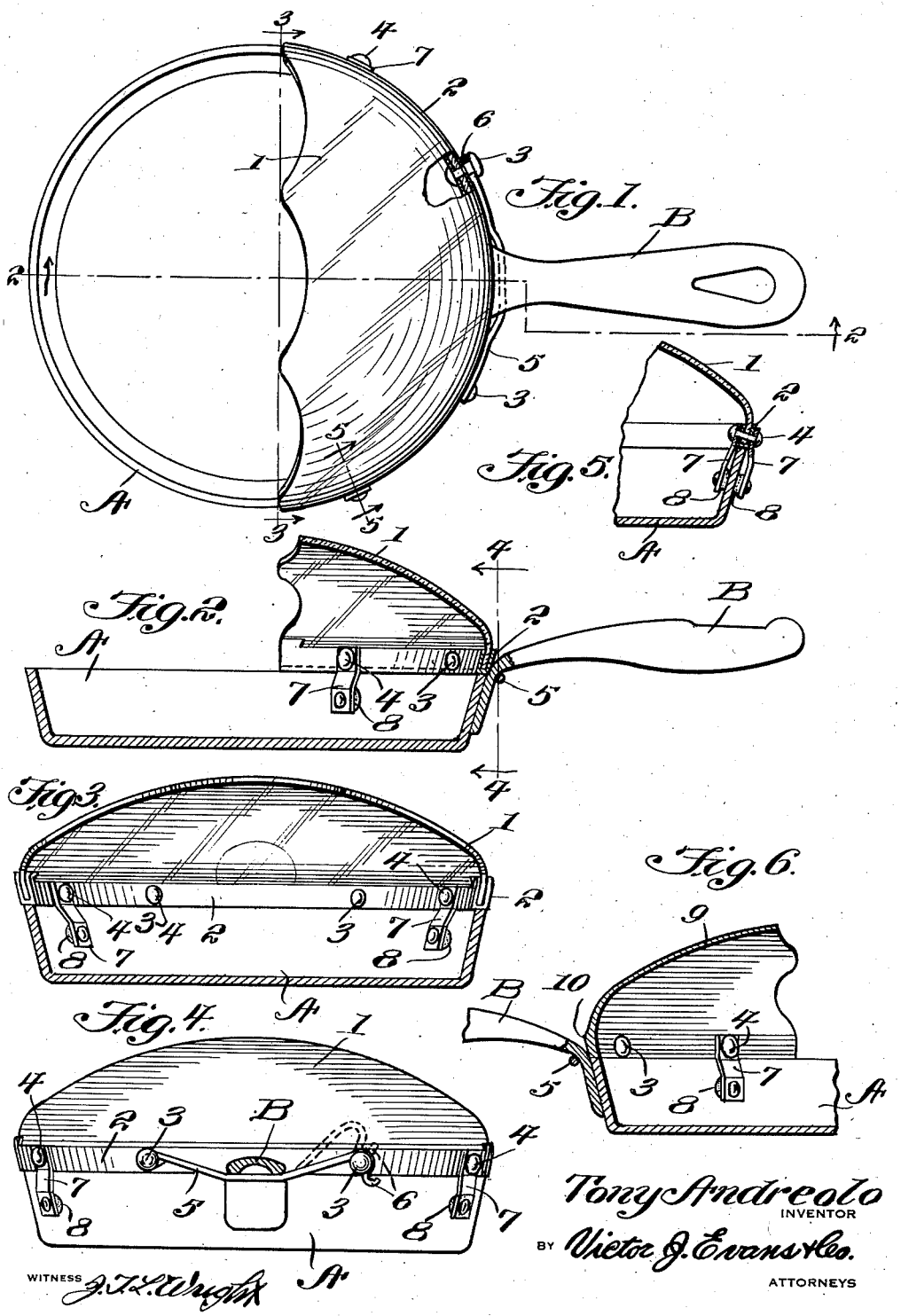

2,148,181

UNITED STATES PATENT OFFICE 2,148,181

PROTECTING SHIELD FOR COOKING UTENSILS

Tony Andreolo, Hackensack, N. J.

Application July 18, 1938, Serial No. 219,895

3 Claims. (Cl. 53—7)

This invention relates to frying pans and its general object is to provide a protecting shield for a frying pan or other cooking utensil, that will enable ready application, observation, turning over and removing food and the like with respect to the pan, without fear of the grease spattering upon and burning the cook.

A further object is to provide a protecting shield for a frying pan that is detachable and can be applied and removed with respect thereto, in an easy and expeditious manner, yet casual removal or displacement is practically impossible.

Another object is to provide a protective shield for a frying pan or the like, that includes a hood preferably made from heat resisting transparent material, such as glass, so that the contents of the pan can be observed as will be apparent and the shield is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a top plan view illustrating the shield which forms the subject matter of the present invention, applied to a frying pan.

Figure 2 is a sectional view taken approximately on line 2—2 of Figure 1, looking in the direction of the arrows.

Figure 3 is a sectional view taken approximately on line 3—3 of Figure 1, looking in the direction of the arrows.

Figure 4 is a sectional view taken approximately on line 4—4 of Figure 2, looking in the direction of the arrows.

Figure 5 is a sectional view taken approximately on line 5—5 of Figure 1, looking in the direction of the arrows.

Figure 6 is a fragmentary sectional view taken through a protecting device that includes a metallic hood, and is shown applied to a pan.

Referring to the drawing in detail, it will be noted that I have illustrated my shield as being applied to a frying pan, but it can be used with any type of cooking utensil, in the same manner as with the pan as shown. The pan is of the usual construction, in that it includes a receptacle portion A and a handle B secured thereto.

The protecting shield includes a hood 1 which is of substantially semi-dome shaped formation to overlie and cover approximately one-half of the receptacle portion of the pan, as best shown in Figure 1, and the hood of the form as shown in Figures 1 to 5 inclusive, is made from any suitable heat resisting transparent material, such as glass. The lower edge portion of the hood is downwardly directed from the remaining portion thereof in curved formation, and is of arcuate shape to follow the shape of the receptacle portion of the pan, while the upper or opposite edge portion of the hood is shown as being scalloped.

The lower edge portion of the hood is mounted in an arcuate shaped channel member 2 that is seated on to rest upon the upper edge of the receptacle portion A for disposal along and upon opposite sides of the point of juncture with the handle therewith, as best shown in Figure 1. The hood is secured in the channel member 2 by headed studs 3 and 4 respectively that have their shanks extending through the lower edge portion of the hood and the walls of the channel member.

It will be noted that I employ dual fastening means for securing the shield to the pan, but which will allow for ready application and removal of the shield with respect thereto, but casual removal or displacement is practically impossible. One of the fastening means is in the form of a latch that includes a spring arm 5 preferably made from a strand of resilient wire that has one end looped upon itself to provide an eye disposed about the shank of one of the headed studs 3 and the arm is bent in substantially arcuate formation for disposal below and in contacting engagement with the handle B, while the opposite end terminates in a hook 6 to be received by the other headed stud 3 for engagement with the shank thereof, and is held accordingly by the head, as clearly shown in Figure 4. The hooked or free end of the arm 5 terminates in an outwardly flared end to facilitate the application of the spring arm to the stud, as will be apparent.

The other fastening means includes relatively small narrow rectangular shaped plates 7 arranged in companion pairs to provide clamping means, and the plates 7 are disposed upon opposite sides of the channel member 2 in depending relation with respect thereto and are fixed accordingly, by the headed studs 4. The plates or clamping members 7 are preferably outwardly directed from their connection with the channel member and thence are inwardly directed, with buttons or blocks 8 riveted or otherwise secured to the lower ends thereof and upon their inner faces for engagement with the inner and outer surfaces of the wall of the receptacle portion A, as best shown in Figure 5. The buttons or blocks 8 are made from any suitable heat resisting material, such as fiber or the like, and the plates are made from resilient material, so that they will act to set up a clamping engagement with the receptacle portion, as will be apparent.

In the form of Figure 6, the hood which for distinction is indicated by the reference numeral 9 is shown as being shaped identical to that of the shape of the hood 1, but is made from metal, and the lower edge portion of the hood 9 is disposed in direct engagement with the upper edge of the receptacle portion A, as an arcuate shaped channel member in this form is unnecessary due to the fact that the hood is formed from metal. The hood 9 is preferably thickened as at 10 along its arcuate receptacle engaging edge and is secured to the receptacle portion B by the same type of fastening means used in the form of Figures 1 to 5 inclusive. Therefore, further description of the form of Figure 6 is deemed unnecessary.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A protecting shield for a handled cooking utensil, comprising a hood for disposal over the utensil to overlie and cover a portion thereof, latching means including a spring arm connected to the hood at one end and having a hooked free end, keeper means connected to the hood and arranged in the path of the hooked free end, and said arm being adapted for disposal about the handle of the utensil with the hooked free end engaged with the keeper means for detachably securing the hood to the utensil.

2. A protecting shield for a handled cooking utensil, comprising a hood for disposal over the utensil to overlie and cover a portion thereof, clamping means secured to the hood and engaged with the utensil, latching means including a spring arm connected to the hood at one end and having a hooked free end, keeper means connected to the hood and arranged in the path of the hooked free end, and said arm being adapted for disposal about the handle of the utensil with the hooked free end engaged with the keeper means for cooperation with the clamping means for detachably securing the hood to the utensil.

3. A protecting shield for a handled cooking utensil, comprising a substantially semi-dome shaped hood formed from transparent material and for disposal over the utensil to overlie and cover a portion thereof, an arcuate shaped channel member having the lower edge portions of the hood mounted in the channel thereof, headed studs securing the hood to the channel member, spring clamping means secured to and depending from certain of said studs and engageable with the opposite side of the receptacle portion of the utensil to set up a clamping action therewith, latching means including a spring arm having one end secured to another of said studs and provided with a hooked free end, and said arm being adapted to underlie the handle of the utensil with the hooked free end engaged with still another stud arranged in the path thereof, for cooperation with the spring clamping means for detachably securing the hood to the utensil.

TONY ANDREOLO.